United States Patent
Friesen et al.

(10) Patent No.: US 12,060,813 B2
(45) Date of Patent: Aug. 13, 2024

(54) SYSTEMS FOR GENERATING WATER WITH WASTE HEAT AND RELATED METHODS THEREFOR

(71) Applicant: Source Global, PBC, Scottsdale, AZ (US)

(72) Inventors: Cody Friesen, Fort McDowell, AZ (US); Heath Lorzel, Mesa, AZ (US)

(73) Assignee: Source Global, PBC, Scottsdale, AZ (US)

( * ) Notice: Subject to any disclaimer, the term of this patent is extended or adjusted under 35 U.S.C. 154(b) by 0 days.

(21) Appl. No.: 18/085,456

(22) Filed: Dec. 20, 2022

(65) Prior Publication Data

US 2023/0130872 A1    Apr. 27, 2023

Related U.S. Application Data

(63) Continuation of application No. 16/753,560, filed as application No. PCT/US2018/054715 on Oct. 5, 2018, now Pat. No. 11,555,421.

(60) Provisional application No. 62/569,381, filed on Oct. 6, 2017.

(51) Int. Cl.
*B01D 53/04* (2006.01)
*B01D 53/26* (2006.01)
*F01K 13/02* (2006.01)

(52) U.S. Cl.
CPC .......... *F01K 13/02* (2013.01); *B01D 53/0438* (2013.01); *B01D 53/261* (2013.01); *B01D 53/263* (2013.01); *B01D 2251/302* (2013.01); *B01D 2251/304* (2013.01); *B01D 2251/306* (2013.01); *B01D 2251/402* (2013.01); *B01D 2251/404* (2013.01); *B01D 2253/102* (2013.01); *B01D 2253/104* (2013.01); *B01D 2253/108* (2013.01); *B01D 2253/11* (2013.01); *B01D 2253/1124* (2013.01); *B01D 2259/40098* (2013.01)

(58) Field of Classification Search
CPC ..... F01K 13/02; F01K 13/00; B01D 53/0438; B01D 53/04; B01D 53/261; B01D 53/26; B01D 53/263; B01D 2251/302; B01D 2251/304; B01D 2251/306; B01D 2251/402; B01D 2251/404; B01D 2253/102; B01D 2253/104; B01D 2253/108; B01D 2253/11; B01D 2253/1124; B01D 2259/40098; B01D 2251/60; B01D 2252/2023; B01D 2253/106
USPC .......... 95/14, 18, 23, 117, 123; 96/109, 112; 34/80, 472, 473
See application file for complete search history.

(56) References Cited

U.S. PATENT DOCUMENTS

| | | | | |
|---|---|---|---|---|
| 2,284,914 | A * | 6/1942 | Miller | F24F 11/30 62/271 |
| 10,718,101 | B2 * | 7/2020 | Panda | B01D 53/261 |
| 11,555,421 | B2 * | 1/2023 | Friesen | B01D 53/261 |
| 2007/0028769 | A1 * | 2/2007 | Eplee | B01D 53/06 95/113 |
| 2009/0173376 | A1 * | 7/2009 | Spencer | F24S 40/42 126/569 |
| 2010/0170499 | A1 * | 7/2010 | Bar | E03B 3/28 62/235.1 |
| 2013/0318790 | A1 * | 12/2013 | Becze | F24F 3/1417 29/890.07 |

* cited by examiner

*Primary Examiner* — Frank M Lawrence, Jr.
(74) *Attorney, Agent, or Firm* — Snell & Wilmer L.L.P.

(57) ABSTRACT

This disclosure is related to systems, methods, apparatuses, and techniques for generating water using waste heat. In certain embodiments, a system includes a water generating unit and a waste-heat-generating-system. The water generating unit can be configured to generate the water and comprises a desiccation device and a condenser coupled to the desiccation device. The waste-heat-generating-system can generate the waste heat when operating or is use. The water generating unit can be configured to use waste heat generated by the waste-heat-generating-system to generate the water.

21 Claims, 5 Drawing Sheets

400

| 401 – Providing a water generating unit |
| 402 – Providing the waste-heat-generating-system |

| 501 – Providing a desiccation device |
| 502   Providing a condenser |
| 503 – Coupling the condenser to the desiccation device |
| 504 – Configuring the water generating unit to use waste heat to generate the water |
| 505 – Configuring the water generating unit to use native heat to generate the water |

| 601 – Providing a waste-heat-receiving heat exchanger configured to receive the waste heat from a waste-heat-generating-system |
| 602 – Coupling the waste-heat-receiving heat exchanger to the desiccation device and the condenser |

| 701 – Providing a heater |

| 702 – Coupling the heater to the desiccation device and the condenser |

| 801 – Measuring a waste heat temperature of waste heat generated by a waste-heat-generating-system |

| 802 – Measuring a waste heat rate of flow of the waste heat |

| 803 – Controlling a blower speed of a blower of a water generating unit based on the waste heat temperature and the waste heat rate of flow |

| 804 – Controlling a circulator speed of a circulator of the water generating unit based on the waste heat temperature and the waste heat rate of flow |

| 805 – Controlling an actuator speed of an actuator of the desiccation device of the water generating unit based on the waste heat temperature and the waste heat rate of flow |

| 806 – Determining whether to generate water with the water generating unit using native heat generated by a heater of the water generating unit, the waste heat, or the native heat and the waste heat based on the waste heat temperature and the waste heat rate of flow |

FIG. 8

SYSTEMS FOR GENERATING WATER WITH WASTE HEAT AND RELATED METHODS THEREFOR

CROSS-REFERENCE TO RELATED APPLICATIONS

This application is a continuation of U.S. patent application Ser. No. 16/753,560 filed on Apr. 3, 2020 entitled "SYSTEMS FOR GENERATING WATER WITH WASTE HEAT AND RELATED METHODS THEREFOR," which is a U.S. national phase filing under 35 U.S.C. § 371 of PCT/US2018/054715 filed on Oct. 5, 2018 entitled "SYSTEMS FOR GENERATING WATER WITH WASTE HEAT AND RELATED METHODS THEREFOR," which claims priority to, and the benefit of, U.S. Provisional Patent Application No. 62/569,381 filed on Oct. 6, 2017, which is entitled "SYSTEMS FOR GENERATING WATER WITH WASTE HEAT AND RELATED METHODS THEREFOR," the entireties of which are incorporated herein by reference.

TECHNICAL FIELD

The present disclosure is related to systems, methods, apparatuses, and techniques for generating water using waste heat.

BACKGROUND

Many different systems, apparatuses, and devices produce heat during operation. For example, heat may be produced by engines, household devices (e.g., refrigeration systems, air conditioners, stoves, gas heaters, etc.), generators, fuel cells, and/or many other systems, apparatuses, and devices. In many cases, the heat of can be a by-product that is produced during the operation of these systems, apparatuses, and devices. The heat generated by these systems, apparatuses, and devices is typically released into the atmosphere in the vicinity of the systems, apparatuses, and devices, and is not used for any purpose. There exists a need for systems, methods, and apparatuses that advantageously make use of waste heat.

BRIEF DESCRIPTION OF THE DRAWINGS

To facilitate further description of the embodiments, the following drawings are provided in which:

FIG. 4 illustrates a flow chart for an embodiment of a method of providing (e.g., manufacturing) a system;

FIG. 5 illustrates a flow chart for an exemplary activity of providing a water generating unit, according to the embodiment of FIG. 4;

FIG. 6 illustrates a flow chart for an exemplary activity of configuring the water generating unit to use waste heat to generate water, according to the embodiment of FIG. 4;

FIG. 7 illustrates a flow chart for an exemplary activity of configuring the water generating unit to use native heat to generate the water, according to the embodiment of FIG. 4; and FIG. 8 illustrates a flow chart for an embodiment of a method.

Figure 1:
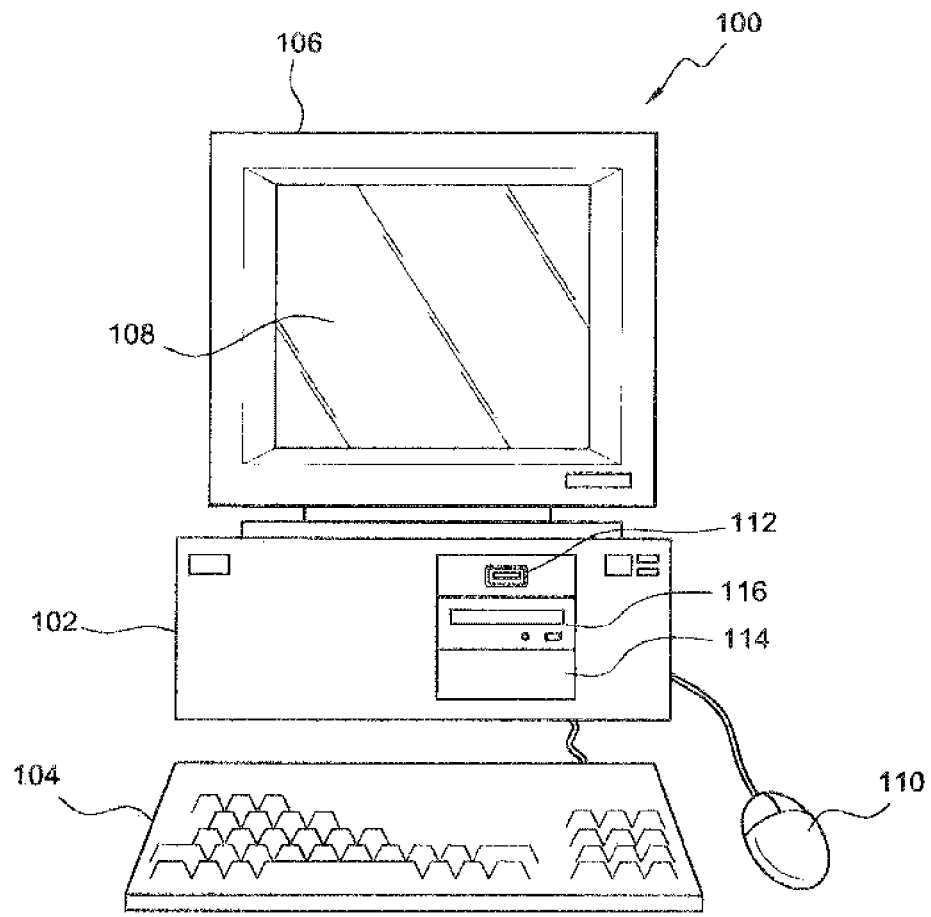
FIG. 1 illustrates a front elevational view of an exemplary computer system that is suitable to implement at least part of a water generating unit control system of the system of FIG. 3, and/or to implement at least part of one or more of the activities of the method of FIG. 8 or one or more other methods described herein.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION OF EXAMPLES OF EMBODIMENTS

According to certain embodiments, a system is provided to make water available to a user, and the system comprises a water generating unit configured to generate the water; wherein: the water generating unit comprises a desiccation device and a condenser coupled to the desiccation device; the water generating unit is configured to use waste heat generated by a waste-heat-generating-system to generate the water; the waste-heat-generating-system generates the waste heat when operating; and the waste heat is unused by the waste-heat-generating-system after being generated by the waste-heat-generating-system.

According to certain embodiments, a method is disclosed for providing a system configured to make water available to a user, the method comprises: providing a water generating unit; wherein: providing the water generating unit comprises: providing a desiccation device; providing a condenser; coupling the condenser to the desiccation device; and configuring the water generating unit to use waste heat to generate the water; the waste heat is generated by a waste-heat-generating-system; the waste-heat-generating-system generates the waste heat when operating; and the waste heat is unused by the waste-heat-generating-system after being generated by the waste-heat-generating-system.

According to certain embodiments, a system is provided that comprises: one or more processors; and one or more non-transitory memory storage devices storing computer instructions configured to run on the one or more processors and perform: measuring a waste heat temperature of waste heat generated by a waste-heat-generating-system, wherein the waste-heat-generating-system generates the waste heat when operating, and the waste heat is unused by the waste-heat-generating-system after being generated by the waste-heat-generating-system; measuring a waste heat rate of flow of the waste heat; and at least one of: controlling a blower speed of a blower of a water generating unit based on the waste heat temperature and the waste heat rate of flow, wherein the water generating unit is configured to generate water from the waste heat, and the water generating unit comprises a desiccation device, a condenser coupled to the desiccation device; controlling a circulator speed of a circulator of the water generating unit based on the waste heat temperature and the waste heat rate of flow; or controlling an actuator speed of an actuator of the desiccation device of the water generating unit based on the waste heat temperature and the waste heat rate of flow.

According to certain embodiments, a method is implemented via execution of computer instructions configured to run at one or more processors and configured to be stored at one or more non-transitory memory storage devices, and the method comprises: measuring a waste heat temperature of waste heat generated by a waste-heat-generating-system, wherein the waste-heat-generating-system generates the waste heat when operating, and the waste heat is unused by the waste-heat-generating-system after being generated by the waste-heat-generating-system; measuring a waste heat rate of flow of the waste heat; and at least one of: controlling a blower speed of a blower of a water generating unit based on the waste heat temperature and the waste heat rate of flow, wherein the water generating unit is configured to generate water from the waste heat, and the water generating unit comprises a desiccation device, a condenser coupled to the desiccation device; controlling a circulator speed of a circulator of the water generating unit based on the waste heat temperature and the waste heat rate of flow; or controlling an actuator speed of an actuator of the desiccation device of the water generating unit based on the waste heat temperature and the waste heat rate of flow.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage devices described herein. For example, in some embodiments, all or a portion of computer system 100 can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) also can be appropriate for implementing part or all of one or more embodiments of the techniques, methods, and/or systems described herein.

In many embodiments, computer system 100 can comprise chassis 102 containing one or more circuit boards (not shown), a Universal Serial Bus (USB) port 112, a hard drive 114, and an optical disc drive 116. Meanwhile, for example, optical disc drive 116 can comprise a Compact Disc Read-Only Memory (CD-ROM), a Digital Video Disc (DVD) drive, or a Blu-ray drive. Still, in other embodiments, a different or separate one of a chassis 102 (and its internal components) can be suitable for implementing part or all of one or more embodiments of the techniques, methods, and/or systems described herein.

Figure 2:
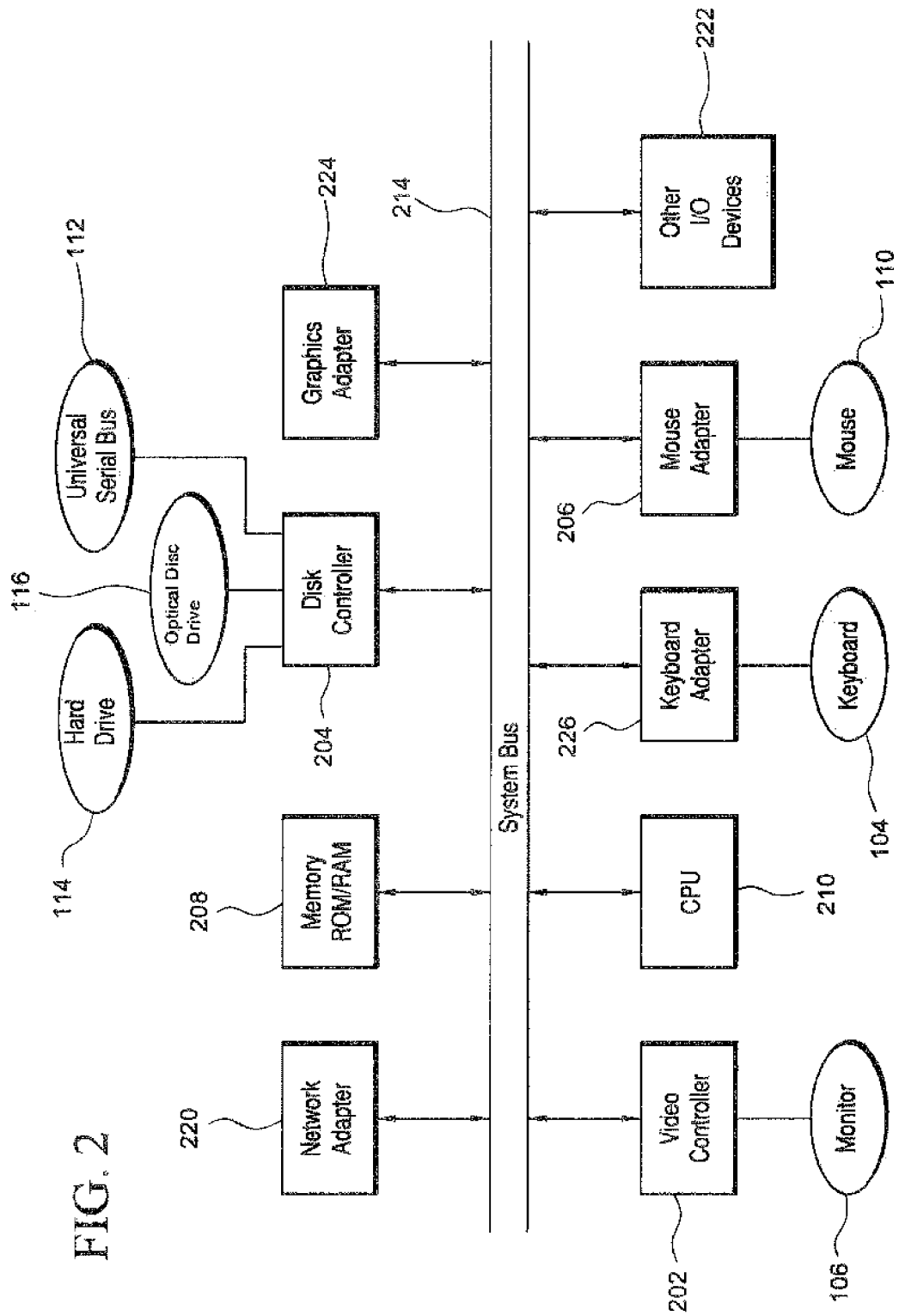
FIG. 2 illustrates a representative block diagram of exemplary elements included on the circuit boards inside a chassis of the computer system of FIG. 1.

Turning ahead in the drawings, FIG. 2 illustrates a representative block diagram of exemplary elements included on the circuit boards inside chassis 102 (FIG. 2). For example, a central processing unit (CPU) 210 is coupled to a system bus 214. In various embodiments, the architecture of CPU 210 can be compliant with any of a variety of commercially distributed architecture families.

In many embodiments, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

The memory storage device(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1 & 2), hard drive 114 (FIGS. 1 & 2), optical disc drive 116 (FIGS. 1 & 2), a floppy disk drive (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 100 (FIG. 1) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 100 (FIG. 1). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Washington, United States of America, (ii) Mac® OS by Apple Inc. of Cupertino, California, United States of America, (iii) UNIX® OS, and (iv) Linux® OS. Further exemplary operating systems can comprise (i) iOS™ by Apple Inc. of Cupertino, California, United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Washington, United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1 & 2) and mouse 110 (FIGS. 1 & 2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1 & 2) to display images on a screen 108 (FIG. 1) of computer system 100 (FIG. 1). Disk controller 204 can control hard drive 114 (FIGS. 1 & 2), USB port 112 (FIGS. 1 & 2), and CD-ROM drive 116 (FIGS. 1 & 2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage device(s) of the various embodiments disclosed herein can be executed by CPU 210 (FIG. 2). At least a portion of the program instructions, stored on these devices, can be suitable for carrying out at least part of the techniques, methods, and activities of the methods described herein. In various embodiments, computer system 100 can be reprogrammed with one or more systems, applications, and/or databases to convert computer system 100 from a general purpose computer to a special purpose computer.

Further, although computer system 100 is illustrated as a desktop computer in FIG. 1, in many examples, system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise an embedded system.

Figure 3:
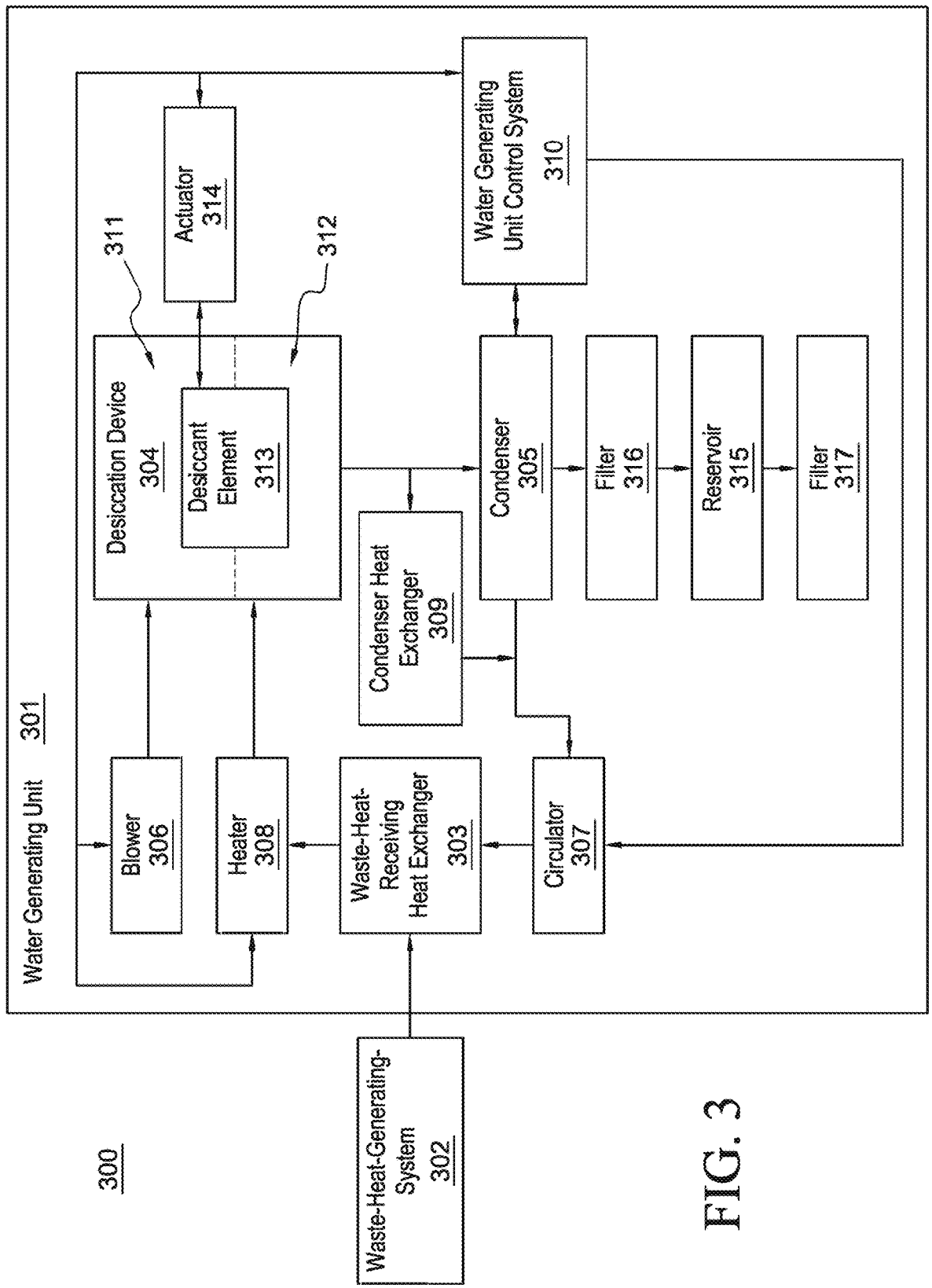
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements of system 300 can perform various methods and/or activities of those methods. In these or other embodiments, the methods and/or the activities of the methods can be performed by other suitable elements of system 300.

As explained in greater detail below, in many embodiments, system 300 can make available water to a user of system 300. In these or other embodiments, system 300 can generate water, such as, for example, using native heat generated by a heater and/or waste heat generated by a waste-heat-generating-system. In many embodiments, the water made available to the user of system 300 can comprise the water generated by system 300.

Generally, therefore, system 300 can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of system 300 described herein.

System 300 comprises a water generating unit 301. In some embodiments, system 300 also can comprise a waste-heat-generating-system 302.

Further, water generating unit 301 can comprise a waste-heat-receiving-heat exchanger 303, a desiccation device 304, a condenser 305, a blower 306, and a circulator 307. Further, desiccation device 304 can comprise an adsorption zone 311, a desorption zone 312, a desiccant element 313, and an actuator 314.

In many embodiments, water generating unit 301 can comprise a heater 308. In these or other embodiments, water generating unit 301 can comprise a condenser heat exchanger 309, a water generating unit control system 310, a reservoir 315, a filter 316, and/or a filter 317. In other embodiments, heater 308, condenser heat exchanger 309, water generating unit control system 310, reservoir 315, filter 316, and/or filter 317 can be omitted.

Waste-heat-receiving-heat exchanger 303 can be coupled to desiccation device 304, desiccation device 304 can be coupled to condenser 305, and condenser 305 can be coupled to waste-heat-receiving-heat exchanger 303. Further, when water generating unit 301 comprises heater 308, heater 308 can be coupled to condenser 305 and desiccation device 304.

In some embodiments, when water generating unit 301 comprises heater 308, heater 308 can be coupled in series with waste-heat-receiving-heat exchanger 303, such as, for example, between condenser 305 and waste-heat-receiving-heat exchanger 303 or between waste-heat-receiving-heat exchanger 303 and desiccation device 304 (as illustrated in FIG. 3). In other embodiments, when water generating unit 301 comprises heater 308, heater 308 can be coupled in parallel with waste-heat-receiving-heat exchanger 303, such as, for example, between condenser 305 and desiccation device 304.

In many embodiments, circulator 307 can operably move and repeatedly cycle one or more regeneration fluids from waste-heat-receiving-heat exchanger 303 and/or heater 308, to desiccation device 304 to condenser 305 and back to waste-heat-receiving-heat exchanger 303 and/or heater 308 (e.g., in a closed loop). Waste-heat-receiving-heat exchanger 303, heater 308 (when implemented), desiccation device 304, and condenser 305 can be coupled together by any suitable conduits configured to transfer the regeneration fluid(s) among waste-heat-receiving-heat exchanger 303, heater 308 (when implemented), desiccation device 304, and condenser 305. Exemplary regeneration fluid(s) can comprise humid air, one or more supersaturated or high relative humidity gases (e.g., a relatively humidity greater than approximately 90%), one or more glycols, one or more ionic liquids, etc.

Circulator 307 can comprise any suitable device configured to move the regeneration fluid(s) from waste-heat-receiving-heat exchanger 303 and/or heater 308, to desiccation device 304 to condenser 305 and back to waste-heat-receiving-heat exchanger 303 and/or heater 308. For example, in some embodiments, circulator 307 can comprise a pump.

In many embodiments, desiccation device 304 can receive the regeneration fluid(s) at desorption zone 312. In many embodiments, after the regeneration fluid(s) are received at desorption zone 312, the regeneration fluid(s) can be moved to condenser 305. In some of these embodiments, the regeneration fluid(s) can be moved to one or more additional desiccation devices before being moved to condenser 305, as explained below.

In many embodiments, blower 311 can move a process fluid (e.g., humid air) to desiccation device 304. For example, in some embodiments, desiccation device 304 can receive the process fluid at adsorption zone 311. Further, blower 311 can move the process fluid through desiccation device 304 (e.g., through adsorption zone 311). In some embodiments, after the process fluid is received at adsorption zone 311, the process fluid can be exhausted to the atmosphere around (e.g., adjacent to) water generating unit 301.

Blower 311 can comprise any suitable device configured to move the process fluid to desiccation device 304. For example, in some embodiments, blower 311 can comprise a pump.

In many embodiments, actuator 314 can operably move and repeatedly cycle desiccant element 313, or portions thereof, between adsorption zone 311 and desorption zone 312 to capture (e.g., absorb and/or adsorb) water from the process fluid received at adsorption zone 311 and desorb water into the regeneration fluid(s) received at desorption zone 312. For example, in some embodiments, desiccant element 313 can be disposed on a wheel located partially at adsorption zone 311 and partially at desorption zone 312. Accordingly, in these embodiments, portions of desiccant element 313 can be simultaneously located at adsorption zone 311 and at desorption zone 312, such as, for example, so that desiccant element 313 can simultaneously capture (e.g., absorb and/or adsorb) water from the process fluid received at adsorption zone 311 and desorb water into the regeneration fluid(s) received at desorption zone 312. Meanwhile, actuator 314 can operably rotate the wheel so that continuously changing portions of desiccant element 313 are located at adsorption zone 311 and at desorption zone 312 when actuator 314 rotates the wheel.

In some embodiments, desiccant element 313 can comprise any suitable material or materials configured such that desiccant element 313 can capture (e.g., absorb and/or adsorb) and desorb water. For example, the material(s) of desiccant element 313 can comprise one or more hygroscopic materials. In many embodiments, exemplary material(s) for desiccant element 313 can comprise silica, silica gel, alumina, alumina gel, montmorillonite clay, one or more zeolites, one or more molecular sieves, activated carbon, one or more metal oxides, one or more lithium salts, one or more calcium salts, one or more potassium salts, one or more sodium salts, one or more magnesium 25 salts, one or more phosphoric salts, one or more organic salts, one or more metal salts, glycerin, one or more glycols, one or more hydrophilic polymers, one or more polyols, one or more polypropylene fibers, one or more cellulosic fibers, one or more derivatives thereof, and one or more combinations thereof.

In some embodiments, desiccant element 313 can comprise any suitable form or forms configured such that desiccant element 313 can capture (e.g., absorb and/or adsorb) and desorb water. For example, desiccant element 313 can comprise a liquid form and/or a solid form. In further embodiments, desiccant element 313 can comprise a porous solid impregnated with one or more hygroscopic material(s).

In some embodiments, desiccant element 313 can be configured to capture (e.g., absorb and/or adsorb) water at one or more temperatures and/or pressures and can be configured to desorb water at one or more other temperatures and/or pressures. In some embodiments, desiccant element 313 can be implemented with material(s) and/or form(s), and/or can be otherwise configured such that desiccant element 313 does not capture (e.g., absorb and/or adsorb) one or more materials toxic to humans, pets, and/or other animals.

In many embodiments, condenser 305 can extract water from the regeneration fluid(s) received at condenser 305, such as, for example, water that has been desorbed into the regeneration fluid(s) at desorption zone 312 of desiccation device 304. In these embodiments, condenser 305 can condense water vapor from the regeneration fluid(s) into liquid water. Accordingly, in many embodiments, condenser 305 can cool the regeneration fluid(s) by extracting thermal energy from the regeneration fluid(s) in order to condense water vapor from the regeneration fluid(s) into liquid water. In some embodiments, condenser 305 can transfer thermal energy extracted from the regeneration fluid(s) to the process fluid upstream of desiccation device 304 and/or to the atmosphere around (e.g., adjacent to) water generating unit 301.

In many embodiments, waste-heat-receiving-heat exchanger 303 can provide thermal energy to the regeneration fluid(s) so that the regeneration fluid(s) are heated upon arriving at desiccant device 304. Exposing desiccant element 313 of desiccation device 304 to the heated regeneration fluid(s) at desorption zone 312 of desiccation device 304 can regenerate desiccant element 313 of desiccation device 304 by causing water to desorb from desiccant element 313 into the regeneration fluid(s), thereby permitting desiccant element 313 to absorb more water from the process fluid at adsorption zone 311.

In many embodiments, in order to provide thermal energy to the regeneration fluid(s), waste-heat-receiving-heat exchanger 303 can receive waste heat from waste-heat-generating-system 302, can receive the regeneration fluid(s), and can transfer thermal energy from the waste heat to the regeneration fluid(s). Accordingly, water generating unit 301 can use the waste heat generated by waste-heat-generating-system 302 to generate water when the heated regeneration fluid(s) are received at desiccation device 304.

Waste heat of waste-heat-generating-system 302 can refer to heat generated by waste-heat-generating-system 302 (when waste-heat-generating-system 302 operates) that is unused by waste-heat-generating-system 302 after the heat is generated by waste-heat-generating-system 302. For example, in many embodiments, the waste heat of waste-heat-generating-system 302 can result as a by-product of the operation of waste-heat-generating-system 302. In these or other embodiments, the waste heat of waste-heat generating system 302 can be heat that would be released to the atmosphere around (e.g., adjacent to) waste-heat-generating-system 302 if unused by water generating unit 301 to generate water. Accordingly, system 300 advantageously can make use of waste heat of waste-heat-generating-system 302 to generate water rather than have the waste heat be wasted or otherwise go unused.

In many embodiments, when water generating unit 301 comprises heater 308, heater 308 can provide thermal energy to the regeneration fluid(s) so that the regeneration fluid(s) are heated upon arriving at desiccant device 304. For example, in order to provide thermal energy to the regeneration fluid(s), heater 308 can generate native heat, can receive the regeneration fluid(s), and can transfer thermal energy from the native heat to the regeneration fluid(s). The term "native heat" refers to heat generated by heater 308, and is used herein to distinguish heat generated by heater 308 from waste heat generated by waste-heat-generating-system 302.

In some embodiments, water generating unit 301 can be configured to use waste heat of waste-heat-generating-system 302 to supplement and/or replace the native heat of heater 308 to generate water. In some embodiments, when water generating unit 301 is configured to use the waste heat of waste-heat-generating-system 302 to replace the native heat of heater 308 to generate water, heater 308 can be omitted. However, in many embodiments, as explained in greater detail below, water generating unit 301 can comprise heater 308, and heater 308 can be selectively activated or deactivated, as needed, depending on whether the waste heat of waste-heat-generating-system 302 is supplementing or replacing the native heat of heater 308. Further, in these or other embodiments, when water generating unit 301 comprises heater 308, heater 308 can be used to generate water when waste heat from waste-heat-generating-system 302 is unavailable or is insufficient for use to generate water.

In some embodiments, whether water generating unit 301 uses the waste heat of waste-heat-generating-system 302 to supplement or replace the native heat of heater 308 can depend on a waste heat temperature of the waste heat of waste-heat-generating-system 302 and/or a waste heat rate of flow of the waste heat of waste-heat-generating-system 302. For example, in many embodiments, water generating unit 301 can be configured to use the waste heat of waste-heat-generating-system 302 to replace the native heat of heater 308 when the waste heat temperature of the waste heat exceeds a maximum native heat temperature of the native heat generated by heater 308. In these or other embodiments, water generating unit 301 can be configured to use the waste heat of waste-heat-generating-system 302 to supplement the native heat of heater 308 when the waste heat rate of flow of the waste heat exceeds a maximum native heat rate of flow of the native heat generated by heater 308. In further embodiments, water generating unit 301 can be configured to use the waste heat of waste-heat-generating-system 302 to supplement or replace the native heat of heater 308 when the waste heat temperature exceeds a maximum native heat temperature of the native heat generated by heater 308 and when the waste heat rate of flow of the waste heat exceeds a maximum native heat rate of flow of the native heat generated by heater 308. Accordingly, in some embodiments, whether water generating unit 301 uses the waste heat of waste-heat-generating-system 302 to supplement or replace the native heat of heater 308 can depend on the type of system that waste-heat-generating-system 302 comprises, as explained in greater detail below.

Replacing the native heat of heater 308 with the waste heat of waste-heat-generating-system 302 can be advantageous when it is desirable to use energy that would otherwise be used by heater 308 to generate the native heat for other purposes and/or when energy to run heater 308 is unavailable, such as, for example, when heater 308 comprises a solar thermal heater and when sunlight is unavailable. Also, replacing the native heat of heater 308 with the waste heat of waste-heat-generating-system 302 can be advantageous to reduce wear and tear on heater 308. Meanwhile, supplementing the native heat of heater 308 with the waste heat of waste-heat-generating-system 302 can be advantageous to generate more water than may be possible with the native heat of heater 308 alone.

In many embodiments, water generating unit 301 can be configured to use the waste heat of waste-heat-generating-system 302 to replace the native heat of heater 308 when the waste heat temperature of the waste heat is greater than or equal to approximately 80 degrees Celsius, 100 degrees Celsius, 180 degrees Celsius, or 200 degrees Celsius. In these or other embodiments, water generating unit 301 can be configured to use the waste heat of waste-heat-generating-system 302 to supplement the native heat of heater 308 when the waste heat rate of flow of the waste heat is greater than or equal to approximately 1,000 watts, 1,200 watts, 3,000 watts, or 3,500 watts.

In many embodiments, waste-heat-generating-system 302 can comprise any suitable system configured to generate waste heat. Further, in some embodiments, such as, for example, when water generating unit 301 comprises heater 308, waste-heat-generating-system 302 can comprise a system configured to generate waste heat having a waste heat temperature exceeding a maximum native heat temperature of the native heat generated by heater 308 and/or a waste heat rate of flow exceeding a maximum native heat rate of flow of the native heat generated by heater 308.

In many embodiments, waste-heat-generating-system 302 can be a stand-alone system that can operate separately and/or independently from water generating unit 301. In these or other embodiments, waste-heat-generating-system 302 can be useful without being used with water generating unit 301.

In some embodiments, waste-heat-generating-system 302 can comprise a heating fire (e.g., a campfire, a gas heater and/or stove, etc.), a heating element, an electric generator, a fuel cell, a heat engine (e.g., an internal combustion engine), multiple computer servers (e.g., a server farm), or a refrigeration system (e.g., an air conditioner, a refrigerator, etc.). For example, in some embodiments, a gas heater and/or stove can comprise a butane gas heater and/or stove. In some embodiments, a heating fire can comprise a cooking fire, such as, for example, when a heating fire is being used to cook food. Further, a heating element can comprise a cooking element, such as, for example, when a heating element is being used to cook food. In some embodiments, waste-heat-generating-system 302 can be a system other than a system configured to generate water.

As indicated above, the type of system that waste-heat-generating-system 302 comprises can determine whether water generating unit 301 uses the waste heat of waste-heat-generating-system 302 to supplement or replace the native heat of heater 308. In some embodiments, when waste-heat-generating-system 302 comprises a heating fire and/or a cooking fire (e.g., a campfire), waste heat from waste-heat-generating-system 302 may supplement or replace native heat from heater 308, such as, for example, because waste heat from a heating fire and/or a cooking fire (e.g., a campfire) may have a waste heat temperature (e.g., approximately 500 degrees Celsius) and a waste heat rate of flow (e.g., approximately 500 watts-2000 watts) exceeding a maximum native heat temperature and a maximum native heat rate of flow of the native heat of heater 308. In these or other embodiments, when waste-heat-generating-system 302 comprises an electric generator, waste heat from waste-heat-generating-system 302 may replace native heat from heater 308, such as, for example, because waste heat from an electric generator may have a waste heat temperature (e.g., approximately 100 degrees Celsius) exceeding a maximum native heat temperature of the native heat of heater 308, but a waste heat rate of flow (e.g., approximately 800 watts) below a maximum native heat rate of flow of the native heat of heater 308. In these or other embodiments, when waste-heat-generating-system 302 comprises a refrigeration system, waste heat from waste-heat-generating-system 302 may supplement native heat from heater 308, such as, for example, because waste heat from a refrigeration system may have a waste heat rate of flow (e.g., approximately 300 watts-1500 watts) exceeding a maximum native heat rate of flow of the native heat of heater 308, but a waste heat temperature (e.g., approximately 60 degrees Celsius) below a maximum native heat temperature of the native heat of heater 308.

Further, in some embodiments, the type of system that waste-heat-generating-system 302 comprises can determine a size and weight of water generating unit 301. For example, as a waste heat temperature and/or a waste heat rate of flow of the waste heat generated by waste-heat-generating-system 302 increases, a size of water generating unit 301 can be reduced, thereby increasing a portability of water generating unit 301. In particular, as a waste heat temperature and/or a waste heat rate of flow of the waste heat generated by waste-heat-generating-system 302 increases, water generating unit 302 can generate more water for a constant volume of the process fluid and/or a constant surface area of desiccant element 313 up to the physical limits of the process fluid and/or desiccant element 313. In many embodiments, the type of system implemented for waste-heat-generating-system 302 can be selected such that water generating unit 301 can comprise a weight less than or equal to approximately 45 kilograms (100 pounds) or approximately 36 kilograms (80 pounds).

In many embodiments, waste-heat-receiving-heat exchanger 303 can comprise any suitable device configured to receive waste heat from waste-heat-generating-system 302, receive the regeneration fluid(s), and transfer thermal energy from the waste heat to the regeneration fluid(s). For example, in some embodiments, waste-heat-receiving-heat exchanger 303 can comprise a solid wall heat exchanger or coil heat exchanger. The type of heat exchanger implemented for waste-heat-receiving-heat exchanger 303 can depend on the type of system of waste-heat-generating-system 302, on whether the waste heat of waste-heat-generating-system 302 is supplementing or replacing native heat of heater 308, and/or a desired size and/or weight of water generating system 301. For example, in some embodiments, when waste-heat-generating-system 302 comprises a heat engine, waste-heat-receiving-heat exchanger 303 can be mounted to an exhaust device of the heat engine. In other embodiments, when waste-heat-generating-system 302 comprises a campfire, waste-heat-receiving-heat exchanger 303 can be placed in or proximal to the campfire.

In many embodiments, heater 308 can comprise any suitable device configured to generate native heat, receive the regeneration fluid(s), and transfer thermal energy from the native heat to the regeneration fluid(s). For example, in many embodiments, heater 308 can comprise a solar thermal heater. In these embodiments, the solar thermal heater can convert solar insolation to the thermal energy provided to the regeneration fluid(s). In some embodiments, heater 308 can be configured to generate native heat comprising a maximum native heat temperature of approximately 80 degrees Celsius or approximately 100 degrees Celsius and/or a maximum native heat rate of flow of approximately 1,000 watts or approximately 1,200 watts.

Further, in these embodiments, heater 308 can be part of a solar panel, which can generate electricity to electrically power part or all of water generating unit 301. In these or other embodiments, part or all of water generating unit 301 can be electrically powered by any other suitable source of electricity (e.g., a battery, a fuel cell, an electric grid, etc.).

As noted above, in some embodiments, when water generating unit 301 comprises heater 308, heater 308 can be coupled in parallel with waste-heat-receiving-heat exchanger 303, such as, for example, between condenser 305 and desiccation device 304. Arranging heater 308 in parallel with waste-heat-receiving-heat exchanger 303 can be advantageous in situations where only one of waste-heat-receiving-heat exchanger 303 or heater 308 is being used to transfer thermal energy to the regeneration fluid(s). For example, using valves, portions of the conduits routing the regeneration fluid(s) to waste-heat-receiving-heat exchanger 303 or heater 308 can be bypassed when one of waste-heat-receiving-heat exchanger 303 or heater 308 is not in use to reduce losses in thermal energy from the regeneration fluid(s).

In many embodiments, reservoir 315 can store water extracted from the regeneration fluid(s) by condenser 305. Accordingly, reservoir 315 can comprise any suitable receptacle or container configured to store water. Further, reservoir 315 can be coupled to condenser 305 to receive the water extracted from the regeneration fluid(s) by condenser 305.

In many embodiments, filter 316 can be operable to filter water output by condenser 305, such as, for example, to remove one or more materials (e.g., one or more materials toxic to humans) from the water. Accordingly, filter 316 can be coupled to an output of condenser 305, such as, for example, between condenser 305 and reservoir 315. Filter 316 can comprise any suitable device configured to filter water. For example, filter 316 can comprise a carbon filter or a stainless steel frit.

In many embodiments, filter 317 can be operable to filter water output by reservoir 315, such as, for example, to remove one or more materials (e.g., one or more materials toxic to humans) from the water. Accordingly, filter 317 can be coupled to an output of reservoir 315. Filter 317 can comprise any suitable device configured to filter water. For example, filter 317 can comprise a carbon filter or a stainless steel frit. In some embodiments, filter 317 can be omitted, such as, for example, when reservoir 315 is omitted.

In many embodiments, condenser heat exchanger 309 can be operable to transfer thermal energy from the regeneration fluid(s) upstream of condenser 305 to the regeneration fluid(s) downstream of condenser 305. For example, removing thermal energy from the regeneration fluid(s) upstream of condenser 305 can help prime or pre-cool the water vapor in the regeneration fluid(s) to be condensed into liquid water at condenser 305 by reducing the regeneration fluid(s) to nearer to a temperature at which the water vapor will condense into liquid water. Meanwhile, the thermal energy extracted from the regeneration fluid(s) by condenser heat exchanger 309 can be transferred to the regeneration fluid(s) downstream of condenser 305 so that the thermal energy can heat the regeneration fluid(s) upstream of desiccation device 304. As a result, implementing condenser heat exchanger 309 can make system 300 more efficient by making use of thermal energy in the regeneration fluid(s) that would otherwise be lost to condenser 305 to heat the regeneration fluid(s) heading to desiccation device 304.

In some embodiments, water generating unit control system 310 can be operable to control one or more parts of water generating unit 301. For example, in many embodiments, water generating unit control system 310 can control operation of blower 306, circulator 307 and/or actuator 314. Further, in some embodiments, water generating unit control system 310 can control operation of condenser 305, such as, for example, when condenser 305 is implemented as an active device.

For example, in some embodiments, water generating unit control system 310 can control (e.g., increase or decrease) a speed at which blower 306 moves (e.g., pumps) the process fluid. Further, in these or other embodiments, water generating unit control system 310 can control (e.g., increase or decrease) a speed at which circulator 307 moves (e.g., pumps) the regeneration fluid(s). Further still, in these or other embodiments, water generating unit control system 310 can control (e.g., increase or decrease) a speed at which actuator 314 moves (e.g., rotates) desiccant element 313.

In some embodiments, water generating unit control system 310 can employ a control algorithm to control blower 306, circulator 307 and/or actuator 314, such as, for example, in a manner that maximizes the water generated by water generating unit 301. For example, the control algorithm can determine (e.g., solve) optimal control conditions for blower 306, circulator 307 and/or actuator 314 as a function of an ambient air temperature at water generating unit 301, an ambient air relative humidity at water generating unit 301, the waste heat temperature of the waste heat of waste-heat-generating-system 302, the waste heat rate of flow of the waste heat of waste-heat-generating-system 302, the native heat temperature of the native heat of heater 308, and/or the native heat rate of flow of the native heat of heater 308. Accordingly, water generating unit control system 310 can communicate with one or more sensors of water generating unit 301 (e.g., one or more temperature sensors, one or more humidity sensors, one or more heat rate of flow sensors, etc.) configured to measure the ambient air temperature at water generating unit 301, the ambient air relative humidity at water generating unit 301, the waste heat temperature of the waste heat of waste-heat-generating-system 302, the waste heat rate of flow of the waste heat of waste-heat-generating-system 302, the native heat temperature of the native heat of heater 308, and/or the native heat rate of flow of the native heat of heater 308. Further, in these or other embodiments, the control algorithm can determine (e.g., solve) optimal control conditions for blower 306, circulator 307 and/or actuator 314 relative to each other.

For example, in some embodiments, water generating unit control system 310 can decrease the speed of actuator 314 as the ambient air temperature at water generating unit 301 and/or the ambient air relative humidity at water generating unit 301 increases, and/or the waste heat temperature of the waste heat of waste-heat-generating-system 302, the waste heat rate of flow of the waste heat of waste-heat-generating-system 302, the native heat temperature of the native heat of heater 308, and/or the native heat rate of flow of the native heat of heater 308 decreases. In these or other embodiments, water generating unit control system 310 can increase the speed of actuator 314 as the ambient air temperature at water generating unit 301 and/or the ambient air relative humidity at water generating unit 301 decreases, and/or the waste heat temperature of the waste heat of waste-heat-generating-system 302, the waste heat rate of flow of the waste heat of waste-heat-generating-system 302, the native heat temperature of the native heat of heater 308, and/or the native heat rate of flow of the native heat of heater 308 increases.

In some embodiments, water generating unit control system 310 can increase the speed of blower 306 and/or circulator 307 as the ambient air temperature at water generating unit 301 and/or the ambient air relative humidity at water generating unit 301 increases, and/or the waste heat temperature of the waste heat of waste-heat-generatingsystem 302, the waste heat rate of flow of the waste heat of waste-heat-generating-system 302, the native heat temperature of the native heat of heater 308, and/or the native heat rate of flow of the native heat of heater 308 decreases. In these or other embodiments, water generating unit control system 310 can decrease the speed of blower 306 and/or circulator 307 as the ambient air temperature at water generating unit 301 and/or the ambient air relative humidity at water generating unit 301 decreases, and/or the waste heat temperature of the waste heat of waste-heat-generating-system 302, the waste heat rate of flow of the waste heat of waste-heat-generating-system 302, the native heat temperature of the native heat of heater 308, and/or the native heat rate of flow of the native heat of heater 308 increases.

In some embodiments, water generating unit control system 310 can control whether water generating unit 301 uses the waste heat of waste-heat-generating-system 302 and/or the native heat of heater 308 to transfer thermal energy to the regeneration fluid(s). For example, in some embodiments, water generating unit control system 310 can control whether water generating unit 301 uses the waste heat of waste-heat-generating-system 302 and/or the native heat of heater 308 to transfer thermal energy to the regeneration fluid(s) by controlling a path of the regeneration fluid(s) with valves of the conduits that convey the regeneration fluid(s). In these or other embodiments, water generating unit control system 310 can control whether water generating unit 301 uses the waste heat of waste-heat-generating-system 302 and/or the native heat of heater 308 to transfer thermal energy to the regeneration fluid(s) by selectively activating and deactivating heater 308.

In some embodiments, water generating unit control system 310 can employ a control algorithm to control whether water generating unit 301 uses the waste heat of waste-heat-generating-system 302 and/or the native heat of heater 308 to transfer thermal energy to the regeneration fluid(s), such as, for example, in a manner that maximizes the water generated by water generating unit 301 and/or minimizes electricity used by water generating unit 301. For example, the control algorithm can determine whether water generating unit 301 uses the waste heat of waste-heat-generating-system 302 and/or the native heat of heater 308 to transfer thermal energy to the regeneration fluid(s) as a function of an ambient air temperature at water generating unit 301, an ambient air relative humidity at water generating unit 301, the waste heat temperature of the waste heat of waste-heat-generating-system 302, the waste heat rate of flow of the waste heat of waste-heat-generating-system 302, the native heat temperature of the native heat of heater 308, and/or the native heat rate of flow of the native heat of heater 308. Accordingly, water generating unit control system 310 can communicate with one or more sensors of water generating unit 301 (e.g., one or more temperature sensors, one or more humidity sensors, one or more heat rate of flow sensors, etc.) configured to measure the ambient air temperature at water generating unit 301, the ambient air relative humidity at water generating unit 301, the waste heat temperature of the waste heat of waste-heat-generating-system 302, the waste heat rate of flow of the waste heat of waste-heat-generating-system 302, the native heat temperature of the native heat of heater 308, and/or the native heat rate of flow of the native heat of heater 308. In many embodiments, the control algorithm for determining whether water generating unit 301 uses the waste heat of waste-heat-generating-system 302 and/or the native heat of heater 308 to transfer thermal energy to the regeneration fluid(s) can be part of the control algorithm that controls blower 306, circulator 307 and/or actuator 314, and vice versa.

In some embodiments, water generating unit control system 310 can communicate with one or more sensors of water generating unit 301 (e.g., one or more particle sensors, one or more gas sensors, etc.) configured to detect a presence and/or a quantity of one or more materials toxic to humans, pets, and/or other animals in the process fluid. Further, water generating unit control system 310 can be configured to prevent water generating unit 301 from generating water when these material(s) are detected and/or when a predetermined quantity of these material(s) are present in the process fluid. For example, in some embodiments, one or more gases (e.g., carbon monoxide) emitted by waste-heat-generating-system 302 may mix with the process fluid, resulting in water generating unit 301 generating toxic water. Accordingly, water generating unit control system 310 can disable water generating unit 301 upon detecting such conditions.

In many embodiments, water generating unit control system 310 can comprise any suitable device configured to control operation of water generating unit 301. Accordingly, water generating unit control system 310 can be electrically coupled to condenser 305, blower 306, circulator 307, heater 308, actuator 314, and/or one or more sensors (e.g., one or more temperature sensors, one or more humidity sensors, one or more heat rate of flow sensors, one or more particle sensors, one or more gas sensors, etc.) of water generating unit 301. In many embodiments, water generating unit control system 310 can be similar or identical to computer system 100 (FIG. 1).

In some embodiments, water generating unit control system 310 can be located remotely from where water generating unit 301 generates water when controlling operation of water generating unit 301. However, in other embodiments, water generating unit control system 310 can be located near to or at a location where water generating unit 310 generates water when controlling operation of water generating unit 301.

Although system 300 is described with respect to one waste-heat-generating-system (i.e., waste-heat-generating-system 302), in some embodiments, system 300 can be modified and implemented to use waste heat from one or more additional waste-heat-generating-systems, simultaneously and/or at different times. In these embodiments, the waste heat of the multiple waste-heat-generating-systems can be received by one waste-heat-receiving-heat exchanger (e.g., waste-heat-receiving-heat exchanger 303) or multiple waste-heat receiving heat exchangers similar or identical to waste-heat-receiving-heat exchanger 303. Further, the additional waste-heat-generating-systems can be similar or identical to waste-heat-generating-system 302.

Further, although system 300 is described with respect to one desiccation device (i.e., desiccation device 304), in some embodiments, system 300 can be modified and implemented with one or more additional desiccation devices, which can be similar or identical to desiccation device 304. In these embodiments, desiccation device 304 and the additional device(s) can be implemented in series and/or in parallel with each other, as desired.

Turning ahead now in the drawings, FIG. 4 illustrates a flow chart for an embodiment of a method 400 of providing (e.g., manufacturing) a system. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of the method 400 can be performed in any other suitable order. In still other embodiments, one or more of the activities in method 400 can be combined or skipped. In many embodiments, the system can be similar or identical to system 300 (FIG. 3).

In many embodiments, method 400 can comprise activity 401 of providing (e.g., manufacturing) a water generating unit. In some embodiments, performing activity 401 can be similar or identical to providing a water generating unit as described above with respect to system 300 (FIG. 3) and/or water generating unit 301 (FIG. 3). In these or other embodiments, the water generating unit can be similar or identical to water generating unit 301 (FIG. 3). FIG. 5 illustrates an exemplary activity 401, according to the embodiment of FIG. 4.

In many embodiments, activity 401 can comprise activity 501 of providing (e.g., manufacturing) a desiccation device. In some embodiments, performing activity 501 can be similar or identical to providing a desiccation device as described above with respect to system 300 (FIG. 3) and/or desiccation device 304 (FIG. 3). In these or other embodiments, the desiccation device can be similar or identical to desiccation device 304 (FIG. 3).

In many embodiments, activity 401 can comprise activity 502 of providing (e.g., manufacturing) a condenser. In some embodiments, performing activity 502 can be similar or identical to providing a condenser as described above with respect to system 300 (FIG. 3) and/or condenser 305 (FIG. 3). In these or other embodiments, the condenser can be similar or identical to condenser 305 (FIG. 3).

In many embodiments, activity 401 can comprise activity 503 of coupling the condenser to the desiccation device. In some embodiments, performing activity 503 can be similar or identical to coupling the condenser to the desiccation device as described above with respect to system 300 (FIG. 3).

In many embodiments, activity 401 can comprise activity 504 of configuring the water generating unit to use waste heat to generate the water. In some embodiments, performing activity 504 can be similar or identical to configuring the water generating unit to use waste heat to generate the water as described above with respect to system 300 (FIG. 3). In these or other embodiments, the waste heat can be similar or identical to the waste heat described above with respect to system 300 (FIG. 3) and/or waste-heat-generating-system 302 (FIG. 3). FIG. 6 illustrates an exemplary activity 504, according to the embodiment of FIG. 4.

In many embodiments, activity 504 can comprise activity 601 of providing (e.g., manufacturing) a waste-heat-receiving-heat exchanger configured to receive the waste heat from a waste-heat-generating-system. In some embodiments, performing activity 601 can be similar or identical to providing a waste-heat-receiving-heat exchanger configured to receive the waste heat from a waste-heat-generating-system as described above with respect to system 300 (FIG. 3) and/or waste-heat-receiving-heat exchanger 303 (FIG. 3). In these or other embodiments, the waste-heat-receiving-heat exchanger can be similar or identical to waste-heat-receiving-heat exchanger 303 (FIG. 3). Further, the waste-heat-generating-system can be similar or identical to waste-heat-generating-system 302 (FIG. 3).

In many embodiments, activity 504 can comprise activity 602 of coupling the waste-heat-receiving-heat exchanger to the desiccation device and the condenser. In some embodiments, performing activity 602 can be similar or identical to coupling the waste-heat-receiving-heat exchanger to the desiccation device and the condenser as described above with respect to system 300 (FIG. 3).

Returning to FIG. 5, in many embodiments, activity 401 can comprise activity 505 of configuring the water generating unit to use native heat to generate the water. In some embodiments, performing activity 505 can be similar or identical to configuring the water generating unit to use native heat to generate the water as described above with respect to system 300 (FIG. 3) and/or heater 308 (FIG. 3). In these or other embodiments, the native heat can be similar or identical to the native heat described above with respect to system 300 (FIG. 3) and/or heater 308 (FIG. 3). In some embodiments, activity 505 can be omitted. FIG. 7 illustrates an exemplary activity 505, according to the embodiment of FIG. 4.

In many embodiments, activity 505 can comprise activity 701 of providing (e.g., manufacturing) a heater. In some embodiments, performing activity 701 can be similar or identical to providing a heater as described above with respect to system 300 (FIG. 3) and/or heater 308 (FIG. 3). In these or other embodiments, the heater can be similar or identical to heater 308 (FIG. 3). Accordingly, in some embodiments, providing a heater can comprise providing a solar thermal heater.

In many embodiments, activity 505 can comprise activity 702 of coupling the heater to the desiccation device and the condenser. In some embodiments, performing activity 702 can be similar or identical to coupling the heater to the desiccation device and the condenser as described above with respect to system 300 (FIG. 3).

Turning now back to FIG. 4, in many embodiments, method 400 can comprise activity 402 of providing the waste-heat-generating-system. In some embodiments, performing activity 402 can be similar or identical to providing the waste-heat-generating-system as described above with respect to system 300 (FIG. 3) and/or waste-heat-generating-system 302 (FIG. 3).

Turning ahead now in the drawings, FIG. 8 illustrates a flow chart for an embodiment of a method 800. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of the method 800 can be performed in any other suitable order. In still other embodiments, one or more of the activities in method 800 can be combined or skipped.

In many embodiments, method 800 can be implemented via execution of computer instructions configured to run at one or more processors and configured to be stored at one or more non-transitory memory storage devices. In some embodiments, the processor(s) can be similar or identical to the processor(s) described above with respect to computer system 100 (FIG. 1), and/or the non-transitory memory storage device(s) can be similar or identical to the non-transitory memory storage device(s) described above with respect to computer system 100 (FIG. 1). Further, the processor(s) and/or non-transitory memory storage device(s) can be part of a water generating unit control system, which can be similar or identical to water generating unit control system 310 (FIG. 3).

In many embodiments, method 800 can comprise activity 801 of measuring a waste heat temperature of waste heat generated by a waste-heat-generating-system. In some embodiments, performing activity 801 can be similar or identical to measuring a waste heat temperature of waste heat generated by a waste-heat-generating-system as described above with respect to system 300 (FIG. 3) and/or water generating unit control system 310 (FIG. 3). In these or other embodiments, the waste heat can be similar or identical to the waste heat described above with respect to system 300 (FIG. 3). Further, the waste-heat-generating-system can be similar or identical to waste-heat-generating-system 302 (FIG. 3).

In many embodiments, method 800 can comprise activity 802 of measuring a waste heat rate of flow of the waste heat. In some embodiments, performing activity 802 can be similar or identical to measuring a waste heat rate of flow of the waste heat as described above with respect to system 300 (FIG. 3) and/or water generating unit control system 310 (FIG. 3).

In many embodiments, method 800 can comprise activity 803 of controlling (e.g., increasing or decreasing) a blower speed of a blower of a water generating unit based on the waste heat temperature and the waste heat rate of flow. In some embodiments, performing activity 803 can be similar or identical to controlling a blower speed of a blower of a water generating unit based on the waste heat temperature and the waste heat rate of flow as described above with respect to system 300 (FIG. 3) and/or water generating unit control system 310 (FIG. 3). In these or other embodiments, the blower can be similar or identical to blower 306 (FIG. 3). Further, the water generating unit can be similar or identical to water generating unit 301 (FIG. 3).

In many embodiments, method 800 can comprise activity 804 of controlling (e.g., increasing or decreasing) a circulator speed of a circulator of the water generating unit based on the waste heat temperature and the waste heat rate of flow. In some embodiments, performing activity 804 can be similar or identical to controlling a circulator speed of a circulator of the water generating unit based on the waste heat temperature and the waste heat rate of flow as described above with respect to system 300 (FIG. 3) and/or water generating unit control system 310 (FIG. 3). In these or other embodiments, the circulator can be similar or identical to circulator 307 (FIG. 3).

In many embodiments, method 800 can comprise activity 805 of controlling (e.g., increasing or decreasing) an actuator speed of an actuator of the desiccation device of the water generating unit based on the waste heat temperature and the waste heat rate of flow. In some embodiments, performing activity 805 can be similar or identical to controlling an actuator speed of an actuator of the desiccation device of the water generating unit based on the waste heat temperature and the waste heat rate of flow as described above with respect to system 300 (FIG. 3) and/or water generating unit control system 310 (FIG. 3). In these or other embodiments, the actuator can be similar or identical to actuator 314 (FIG. 3).

In many embodiments, method 800 can comprise activity 806 of determining whether to generate water with the water generating unit using native heat generated by a heater of the water generating unit, the waste heat, or the native heat and the waste heat based on the waste heat temperature and the waste heat rate of flow. In some embodiments, performing activity 806 can be similar or identical to determining whether to generate water with the water generating unit using native heat generated by a heater of the water generating unit, the waste heat, or the native heat and the waste heat based on the waste heat temperature and the waste heat rate of flow as described above with respect to system 300 (FIG. 3) and/or water generating unit control system 310 (FIG. 3). For example, in some embodiments, performing activity 806 can comprise activating or deactivating the heater; and/or activating or deactivating one or more valves conveying regeneration fluid(s) moved by the circulator. In these or other embodiments, the native heat can be similar or identical to the native heat described above with respect to system 300 (FIG. 3). Further, the heater can be similar or identical to heater 308 (FIG. 3). In some embodiments, activity 806 can be omitted.

Although the invention has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the activities of the methods described herein may include different activities and be performed by many different elements, in many different orders. As another example, the elements within system 300 (FIG. 3) can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system configured to make water available to a user, the system comprising:
  a water generating unit comprising:
    a desiccation device,
    a condenser, and
    a solar heater configured to generate native heat;
  a waste-heat generating system configured to generate waste heat; and,
  a control system configured to:
    control water generation by water generating unit by controlling whether water generating unit uses the waste heat of waste-heat-generating-system, the native heat of the solar heater, or a combination thereof;
    communicate with one or more sensors of water generating unit; and,
    determine a control condition based on a measurement from the one or more sensors;
  wherein the one or more sensors comprises a temperature sensor, a humidity sensor, or a combination thereof;
  wherein the one or more sensors measure an ambient air temperature, an ambient air relative humidity, a waste heat temperature, a native heat temperature, or a combination thereof; and, wherein the water generating unit is configured to use the waste heat generated by the waste-heat-generating-system to supplement or replace the native heat generated by the solar heater to generate the water.

2. The system of claim 1, wherein the solar heater comprises a solar panel configured to generate electricity to electrically power part or all of the water generating unit.

3. The system of claim 1, further comprising a waste-heat-receiving-heat exchanger configured to receive waste heat from the waste-heat-generating-system, and, wherein the solar heater is coupled in parallel with the waste-heat-receiving-heat exchanger between the condenser and the desiccation device.

4. The system of claim 1, wherein the control system is configured to control transfer of thermal energy to a regeneration fluid by controlling a path of the regeneration fluid.

5. The system of claim 1, wherein the control system is configured to control transfer of thermal energy to a regeneration fluid flowing in a closed loop.

6. The system of claim 1, wherein the control system is configured to control water generation in a manner that maximizes the water generated by water generating unit, minimizes electricity used by water generating unit, or a combination thereof.

7. The system of claim 1, wherein the control system is configured to control a speed at which a circulator moves the regeneration fluid based on an ambient air temperature, an ambient air relative humidity, a waste heat temperature, a waste heat flow rate, a native heat temperature, a native heat flow rate, or a combination thereof.

8. The system of claim 1, wherein the control system is configured to determine whether to generate the water with the water generating unit using the native heat, the waste heat, or both the native heat and the waste heat based on an ambient air temperature, an ambient air relative humidity, a waste heat temperature, a waste heat flow rate, a native heat temperature, a native heat flow rate, or a combination thereof.

9. The system of claim 8, wherein the control system is configured to generate the water with the water generating unit using the waste heat when the waste heat temperature of the waste heat exceeds a maximum native heat temperature of the native heat.

10. The system of claim 8, wherein the control system is configured to generate the water with the water generating unit using the waste heat when the waste heat flow rate of the waste heat exceeds a maximum native heat flow rate of the native heat.

11. The system of claim 1, wherein the waste-heat-generating-system comprises a refrigeration system configured to supplement native heat from the solar heater.

12. A system configured to make water available to a user, the system comprising:
a water generating unit comprising:
a desiccation device,
a condenser, and
a solar heater configured to generate native heat;
a waste-heat generating system configured to generate waste heat, the waste-heat-generating-system comprising a refrigeration system having a waste heat temperature below a maximum native heat temperature of the solar heater; and,
a control system configured to control water generation by water generating unit by controlling whether water generating unit uses the waste heat of waste-heat-generating-system, the native heat of the solar heater, or a combination thereof;

wherein the water generating unit is configured to use the waste heat generated by the waste-heat-generating-system to supplement or replace the native heat generated by the solar heater to generate the water.

13. The system of claim 12, wherein the refrigeration system has a waste heat rate of flow of 300 watts to 1500 watts exceeding a maximum native heat rate of flow of the solar heater.

14. The system of claim 13, wherein the control system is configured to: communicate with one or more sensors of the water generating unit; and, determine a control condition based on a measurement from the one or more sensors.

15. A method comprising:
generating water with a water generating unit, the water generating unit comprising a desiccation device, a condenser, and a solar heater configured to generate native heat;
using waste heat generated by a waste-heat-generating-system to supplement or replace the native heat to generate the water from the water generating unit; and,
determining, by the control system, whether to generate the water with the water generating unit using native heat generated by the solar heater, the waste heat, or the native heat and the waste heat based on an ambient air temperature, an ambient air relative humidity, a waste heat temperature, a waste heat flow rate, a native heat temperature, a native heat flow rate, or a combination thereof; and,
controlling, by a control system, whether the water generating unit uses the waste heat of waste-heat-generating-system, the native heat of the solar heater, or a combination thereof.

16. The method of claim 15, further comprising:
measuring a waste heat temperature of waste heat generated by a waste-heat-generating-system;
measuring a waste heat rate of flow of the waste heat; or a combination thereof.

17. The method of claim 15, further comprising:
determining, by the control system, one or more control conditions to maximize the water generated by water generating unit based on an ambient air temperature, an ambient air relative humidity, a waste heat temperature, a waste heat flow rate, a native heat temperature, a native heat flow rate, or a combination thereof.

18. The method of claim 15, wherein the control system is configured to control:
a blower speed of a blower of the water generating unit;
a circulator speed of a circulator of the water generating unit;
an actuator speed of an actuator of the desiccation device of the water generating unit, or a combination thereof.

19. A method comprising:
generating water with a water generating unit, the water generating unit comprising a desiccation device, a condenser, and a solar heater configured to generate native heat;
using waste heat generated by a waste-heat-generating-system to supplement or replace the native heat to generate the water from the water generating unit;
measuring a waste heat temperature of waste heat generated by a waste-heat-generating-system;
measuring a waste heat rate of flow of the waste heat; or a combination thereof; controlling, by a control system, whether the water generating unit uses the waste heat of waste-heat-generating-system, the native heat of the solar heater, or a combination thereof.

20. A method comprising:

generating water with a water generating unit, the water generating unit comprising a desiccation device, a condenser, and a solar heater configured to generate native heat;

using waste heat generated by a waste-heat-generating-system to supplement or replace the native heat to generate the water from the water generating unit;

determining, by the control system, one or more control conditions to maximize the water generated by water generating unit based on an ambient air temperature, an ambient air relative humidity, a waste heat temperature, a waste heat flow rate, a native heat temperature, a native heat flow rate, or a combination thereof; and, controlling, by a control system, whether the water generating unit uses the waste heat of waste-heat-generating-system, the native heat of the solar heater, or a combination thereof.

21. A method comprising:

generating water with a water generating unit, the water generating unit comprising a desiccation device, a condenser, and a solar heater configured to generate native heat;

using waste heat generated by a waste-heat-generating-system to supplement or replace the native heat to generate the water from the water generating unit; and, controlling, by a control system, whether the water generating unit uses the waste heat of waste-heat-generating-system, the native heat of the solar heater, or a combination thereof;

wherein the control system is configured to control:
  a blower speed of a blower of the water generating unit;
  a circulator speed of a circulator of the water generating unit;
  an actuator speed of an actuator of the desiccation device of the water generating unit; or a combination thereof.

* * * * *